US012273422B2

United States Patent
Bhagavathiperumal et al.

(10) Patent No.: US 12,273,422 B2
(45) Date of Patent: Apr. 8, 2025

(54) SYSTEMS AND METHODS FOR REAL TIME STREAMING, LOGGING, AND REPORTING OF NETWORK DATA

(71) Applicant: Aviz Networks, Inc., San Jose, CA (US)

(72) Inventors: Chidambaram Bhagavathiperumal, Livermore, CA (US); Madhu Paluru, Fremont, CA (US); Sutharsan Srinivasan, Chennai (IN)

(73) Assignee: Aviz Networks, Inc., San Jose, CA (US)

( * ) Notice: Subject to any disclaimer, the term of this patent is extended or adjusted under 35 U.S.C. 154(b) by 0 days.

(21) Appl. No.: 18/098,685

(22) Filed: Jan. 18, 2023

(65) Prior Publication Data

US 2024/0244116 A1    Jul. 18, 2024

(51) Int. Cl.
*H04L 67/00* (2022.01)
*H04L 41/0631* (2022.01)
*H04L 67/62* (2022.01)

(52) U.S. Cl.
CPC .......... *H04L 67/34* (2013.01); *H04L 41/0631* (2013.01); *H04L 41/064* (2013.01); *H04L 67/62* (2022.05)

(58) Field of Classification Search
None
See application file for complete search history.

(56) References Cited

U.S. PATENT DOCUMENTS

| 11,323,305 | B1* | 5/2022 | Liu | H04L 41/0645 |
| 2022/0123964 | A1* | 4/2022 | Alpert | H04L 27/2601 |
| 2022/0256003 | A1* | 8/2022 | M. | G06F 11/3006 |
| 2022/0294816 | A1* | 9/2022 | Martin | G06F 16/9038 |

FOREIGN PATENT DOCUMENTS

| CN | 107133072 A | * | 9/2017 | .......... G06F 11/3041 |
| JP | 2012150621 A | * | 8/2012 | |
| WO | WO-2014153717 A1 | * | 10/2014 | .............. H04W 8/18 |

* cited by examiner

*Primary Examiner* — Lance Leonard Barry
*Assistant Examiner* — Mohammad Yousuf A. Mian
(74) *Attorney, Agent, or Firm* — Select IP Law Corporation; Ashkon Cyrus

(57) ABSTRACT

In some aspects, the system may include collecting, by a target device, event data regarding a new event on occurrence of the new event, where event data includes an old value configured to correlate the event data. Also, the system may include placing, by the target device, the event data into a service specification by using a plurality of intrinsic bindings. Furthermore, the system may include encoding both the old value and a new value into a message packet, where the new value further may include a newly updated value that is being reported as the new event. In addition, the system may include generating a comparison of the old value and the new value. Moreover, the system may include transmitting the message packet to plurality of receiving monitor devices to take action based on the comparison.

6 Claims, 3 Drawing Sheets

300

Collect, by a target device, event data regarding a new event on occurrence of the new event, wherein event data includes an old value configured to correlate the event data
302

↓

Place, by the target device, the event data into a service specification by using a plurality of intrinsic bindings
304

↓

Encode both the old value and a new value into a message packet, wherein the new value further comprises a newly updated value that is being reported as the new event
306

↓

Generate a comparison of the old value and the new value
308

↓

Transmit the message packet to plurality of receiving monitor devices to take action based on the comparison
310

↓

Wherein the message packet is time stamped at the target device to create a timestamp and the timestamp is included in the message packet before transmitting the message packet
312

↓

Wherein the timestamp is fetched as close as possible to an event generation method
314

FIG. 3

SYSTEMS AND METHODS FOR REAL TIME STREAMING, LOGGING, AND REPORTING OF NETWORK DATA

BACKGROUND

Organizations need to regularly track the activity of network nodes such as routers and switches. Traditionally the Simple Network Management Protocol (SNMP) has been used to collect data for these purposes. Recently, newer methods such as telemetry and YANG-based models have been developed to address some of the limitations of SNMP.

While these methods generally support GET, SET, and SUBSCRIBE actions, they are limited in their ability to provide real-time event reporting to monitoring devices. There is a need for improved methods for real-time event and log reporting from target devices to monitoring devices, such that organizations can identify and address any real-time events in a timely manner which can help to optimize the performance of their systems and improve the overall efficiency and effectiveness of their operations.

SUMMARY

Some implementations herein relate to methods for real time logging of network data used in conjunction with a Network Management Interface. For example, an exemplary method may include collecting, by a target device in communication with the Network Management Interface, event data regarding a new event on the occurrence of the new event on the network. The method may also include placing, by the target device, the event data into a service specification data structure by using a plurality of intrinsic bindings. The method may furthermore include encoding both the old value and a new value into a message packet, where the new value further may include a newly updated value that is being reported as the new event. The method may in addition include generating a comparison of the old value and the new value. The method may moreover include transmitting the message packet to plurality of receiving monitor devices to take action based on the predetermined comparison. Other embodiments of this aspect include corresponding computer systems, apparatus, and computer programs recorded on one or more computer storage devices, each configured to perform the actions of the methods.

The described implementations may also include one or more of the following features. A method where the message packet is time stamped at the target device to create a timestamp and the timestamp is included in the message packet before transmitting the message packet. A method where the timestamp is fetched as close as possible to an event generation method. The method may furthermore include receiving a subscription from a client device that has elected interest in receiving events from the target device, where the subscription is configured carry any number of predetermined event paths the client device is interested in. The method may include sending an error message from the target device upon a detection of an unsupported event.

Implementations of the described techniques may include hardware, a method or process, or a computer tangible medium. Some implementations herein relate to a system that may include a target device. System may also include one or more processors. System may furthermore include a non-transitory computer-readable operatively coupled to the processor, and having instructions stored therein that when executed by the processor causes the system to execute one or more methods described below. The system may in addition include collect, by a target device, event data regarding a new event on occurrence of the new event, where event data includes an old value configured to correlate the event data.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

FIG. 3 shows a process according to an embodiment of the present disclosure.

DETAILED DESCRIPTION

Figure 1:
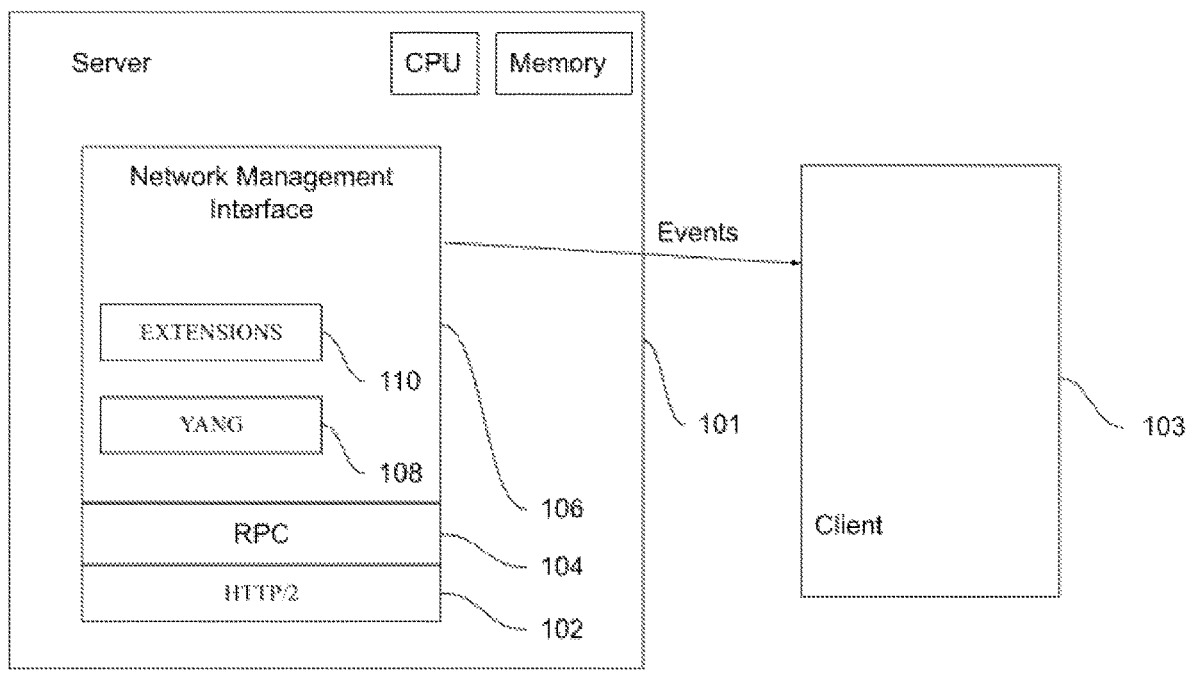
FIG. 1 shows a system architecture according to an embodiment of the present disclosure.

FIG. 1 shows a Network Management Interface 106 running on Server 101 according to an embodiment of the present disclosure. Embodiments of the present disclosure utilize an RPC (Remote Procedure Call) framework 104 built on top of an HTTP/2 layer 102. It can be appreciated that such a system would leverage the performance and security benefits of the HTTP/2 protocol while adding support for sending and receiving data in a format specific to remote procedure calls. Embodiments of the present disclosure further utilize a binary framing layer of HTTP/2 to send and receive binary encoded data representing the procedure call and response, as well as related metadata.

Embodiments of the present disclosure further utilize an additional layer such as gNMI built on top of the RPC framework 104 (providing set, subscribe, and get capabilities). For example, such features could be implemented using a publish-subscribe pattern. It can be appreciated that the set capability allows for sending a procedure call to the server to set a specific value or state, the subscribe capability allows for a client 103 to subscribe to specific updates from the server, and the get capability allows the client 103 to retrieve the current value or state from the server 101.

This additional layer could also include support for pushing updates from the server 101 to the subscribed clients using the HTTP/2 server push mechanism, allowing for efficient and low-latency data transfer. An authentication and authorization system could also be added to secure the transmission of data between the client and server.

The present disclosure further provides an extensions module 110 and YANG module 108 to the Network Management Interface 106. According to an embodiment, the extensions can be carried per message. It can be appreciated that such extensions allow for custom metadata or additional data to be sent along with each procedure call or response.

Figure 2:
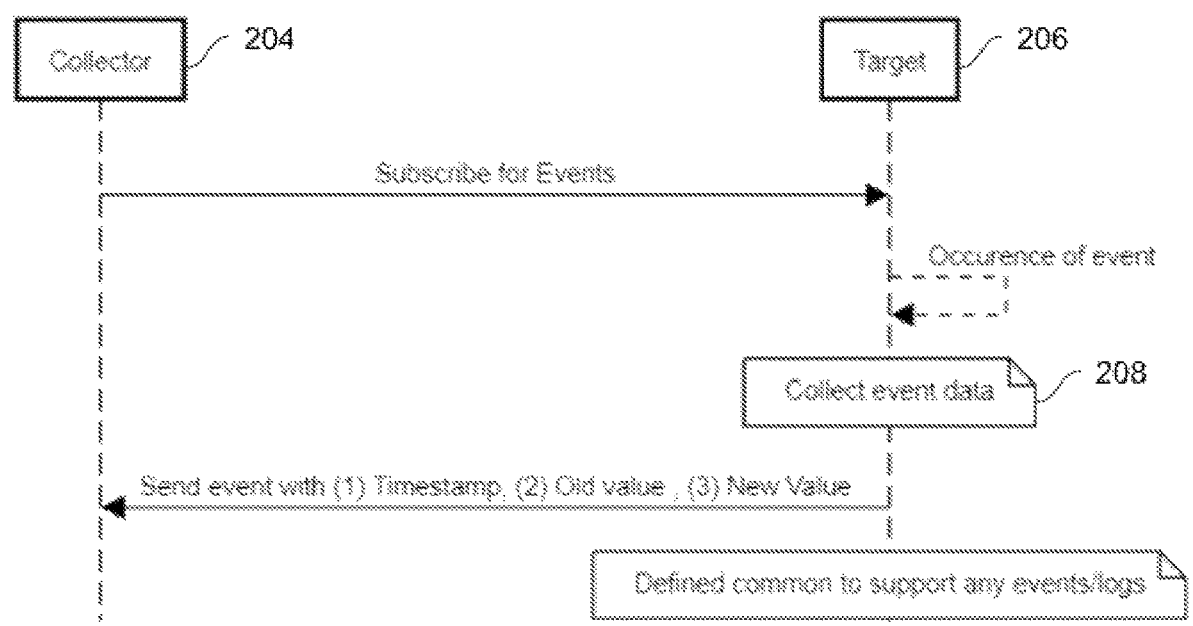
FIG. 2 shows a system diagram of messages between a subscriber device and a target device according to an embodiment of the present disclosure.

FIG. 2 shows a process flow of messages between a subscriber device and a target device according to an embodiment of the present disclosure.

According to an embodiment of the present disclosure, a collector device 204 interested in receiving events from a target device 206 can initiate a subscription using an Event remote procedure call. The subscription can carry any number of event paths the client is interested in. According to an embodiment an unsupported event may result in an error message from the target with proper error messages which are implementation specific.

According to an embodiment, a long-lived subscription service is created between collector device 204 and target device 206 that is configured to run till the client or server closes the subscription due to a number of reasons. According to an embodiment, on occurrence of the events, target device 206 collect event data 208 and send an Event message packet to the collector device 202. According to an embodiment, the event message packet contains a timestamp, old value, and new value. It can be appreciated that the Event message packet is event triggered and thus no guarantee of regular intervals is maintained.

According to an embodiment, a response Event message packet is delivered to the collector device 204 in response to reporting of the specified events from the target device 206. According to an embodiment, the included fields of the response Event message packet may include an extensions field, and according to an embodiment the extensions field is an a repeated field.

According to an embodiment, the response message packet is generated by target device 206 to collector device 204 over an established Event remote procedure call.

According to a further embodiment, an event notification message is embedded in the response message packet. The event notification message may consist of the following fields: timestamp, and a set of events. According to an embodiment, the timestamp field is configured to hold the value of the time at which the reporting event occurred. How close to the event occurring point the timestamp is collected is implementation specific.

As mentioned above, there is a set of events encoded in the event notification message. According to an embodiment, each event contains Path, NewVal, and OldVal variables. According to an embodiment the Path variable is configured the tree path of the event. According to an embodiment the NewVal variable is the newly updated value that is being reported as the event. This field can be used to send the log messages in case of syslog. According to yet another embodiment, OldVal is valid only when sending the events and is used to correlate and arrive at the change. OldVal should always be read in relation to the NewVal.

FIG. 3 is a flowchart of an example process 300. In some implementations, one or more process blocks of FIG. 3 may be performed by a target device.

As shown in FIG. 3, process 300 may include collecting event data regarding a new event on occurrence of the new event, where event data includes an old value configured to correlate the event data (block 302). For example, target device may collect event data regarding a new event on occurrence of the new event, where event data includes an old value configured to correlate the event data, as described above. As also shown in FIG. 3, process 300 may include placing the event data into a service specification by using a plurality of intrinsic bindings (block 304). For example, one such service specification is a GNMI configuration file.

As further shown in FIG. 3, process 300 may include encoding both the old value and a new value into a message packet, where the new value further may include a newly updated value that is being reported as the new event (block 306). For example, target device may encode both the old value and a new value into a message packet, where the new value further may include a newly updated value that is being reported as the new event, as described above. As also shown in FIG. 3, process 300 may include generating a comparison of the old value and the new value (block 308).

For example, target device may generate a comparison of the old value and the new value, as described above. As further shown in FIG. 3, process 300 may include transmitting the message packet to plurality of receiving monitor devices to take action based on the comparison (block 310). For example, target device may transmit the message packet to plurality of receiving monitor devices to take action based on the comparison, as described above.

Process 300 may include additional implementations, such as any single implementation or any combination of implementations described below and/or in connection with one or more other processes described elsewhere herein. In a first implementation, the message packet is time stamped at the target device to create a timestamp and the timestamp is included in the message packet before transmitting the message packet.

In a second implementation, alone or in combination with the first implementation, the timestamp is fetched as close as possible to an event generation method.

In a third implementation, alone or in combination with the first and second implementation, process 300 further includes receiving a subscription from a client device that has elected interest in receiving events from the target device.

In a fourth implementation, alone or in combination with one or more of the first through third implementations, the subscription is configured carry any number of predetermined event paths the client device is interested in.

In a fifth implementation, alone or in combination with one or more of the first through fourth implementations, process 300 may include sending an error message from the target device upon a detection of an unsupported event.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

As it can be inferred from the above figures, various components interact with each other directly or indirectly in a microservice based architecture. It can be appreciated that any configuration or event occurring in the system needs to percolate across multiple microservices before resulting in an end-result.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software.

The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more."

Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   collecting, by a target device, event data regarding a new event on occurrence of the new event, wherein event data includes an old value configured to correlate the event data, wherein target device utilizes a binary framing layer of Hypertext Transfer Protocol Version 2 (HTTP/2) to collect event data, and wherein a collector device has initiated a subscription from the target device using an event remote procedure call;
   placing, by the target device, the event data into a service specification by using a plurality of intrinsic bindings, wherein the service specification further comprises a Google Remote Procedure Call (gRPC) Network Management Interface (GNMI) configuration file;
   encoding both the old value and a new value into a message packet, wherein the new value further comprises a newly updated value that is being reported as the new event;
   receiving a subscription from the collector device that has elected interest in receiving events from the target device in response to the event remote procedure call, wherein the subscription is configured to carry any number of predetermined event paths the collector device is interested in, wherein the predetermined event path further comprise tree paths;
   sending an error message from the target device upon detection of an unsupported event;
   generating a comparison of the old value and the new value; and
   transmitting the message packet to a plurality of receiving monitor devices to take action based on the comparison, wherein the message packet includes an extensions field and wherein the extensions field is a repeated field.

2. The method of claim 1, wherein the message packet is time stamped at the target device to create a timestamp and the timestamp is included in the message packet before transmitting the message packet.

3. A system comprising:
   a target device comprising a processor and memory;
   one or more processors; and
   a non-transitory computer-readable medium operatively coupled to the processor, and having instructions stored therein that when executed by the processor causes the system to:
   collect, by the target device, event data regarding a new event on occurrence of the new event, wherein event data includes an old value configured to correlate the event data, wherein target device utilizes a binary framing layer of Hypertext Transfer Protocol Version 2 (HTTP/2) to collect event data, and wherein a collector device has initiated a subscription from the target device using an event remote procedure call;
   place, by the target device, the event data into a service specification by using a plurality of intrinsic bindings, wherein the service specification further comprises a Google Remote Procedure Call (gRPC) Network Management Interface (GNMI) configuration file;
   encode both the old value and a new value into a message packet, wherein the new value further comprises a newly updated value that is being reported as the new event;
   receive a subscription from the collector device that has elected interest in receiving events from the target device in response to the event remote procedure call, wherein the subscription is configured to carry any number of predetermined event paths the collector device is interested in, wherein the predetermined event path further comprise tree paths;
   generate a comparison of the old value and the new value; and
   send an error message from the target device upon detection of an unsupported event;
      transmit the message packet to a plurality of receiving monitor devices to take action based on the comparison, wherein the message packet includes an extensions field and wherein the extensions field is a repeated field.

4. The system of claim 3, wherein the message packet is time stamped at the target device to create a timestamp and the timestamp is included in the message packet before transmitting the message packet.

5. A non-transitory computer-readable medium storing a set of instructions, the set of instructions comprising:
   a) one or more instructions that, when executed by one or more processors of a target device, cause the target device to:
   b) collect, by the target device, event data regarding a new event on occurrence of the new event, wherein event data includes an old value configured to correlate the event data, wherein target device utilizes a binary framing layer of Hypertext Transfer Protocol Version 2 (HTTP/2) to collect event data, and wherein a collector device has initiated a subscription from the target device using an event remote procedure call;
   c) place, by the target device, the event data into a service specification by using a plurality of intrinsic bindings, wherein the service specification further comprises a Google Remote Procedure Call (gRPC) Network Management Interface (GNMI) configuration file;

d) encode both the old value and a new value into a message packet, wherein the new value further comprises a newly updated value that is being reported as the new event;
e) receive a subscription from the collector device that has elected interest in receiving events from the target device in response to the event remote procedure call, wherein the subscription is configured to carry any number of predetermined event paths the collector device is interested in, wherein the predetermined event path further comprise tree paths;
f) send an error message from the target device upon detection of an unsupported event;
g) generate a comparison of the old value and the new value; and
h) transmit the message packet to plurality of receiving monitor devices to take action based on the comparison, wherein the message packet includes an extensions field and wherein the extensions field is a repeated field.

6. The non-transitory computer-readable medium of claim 5, wherein the message packet is time stamped at the target device to create a timestamp and the timestamp is included in the message packet before transmitting the message packet.

* * * * *